Patented June 30, 1925.

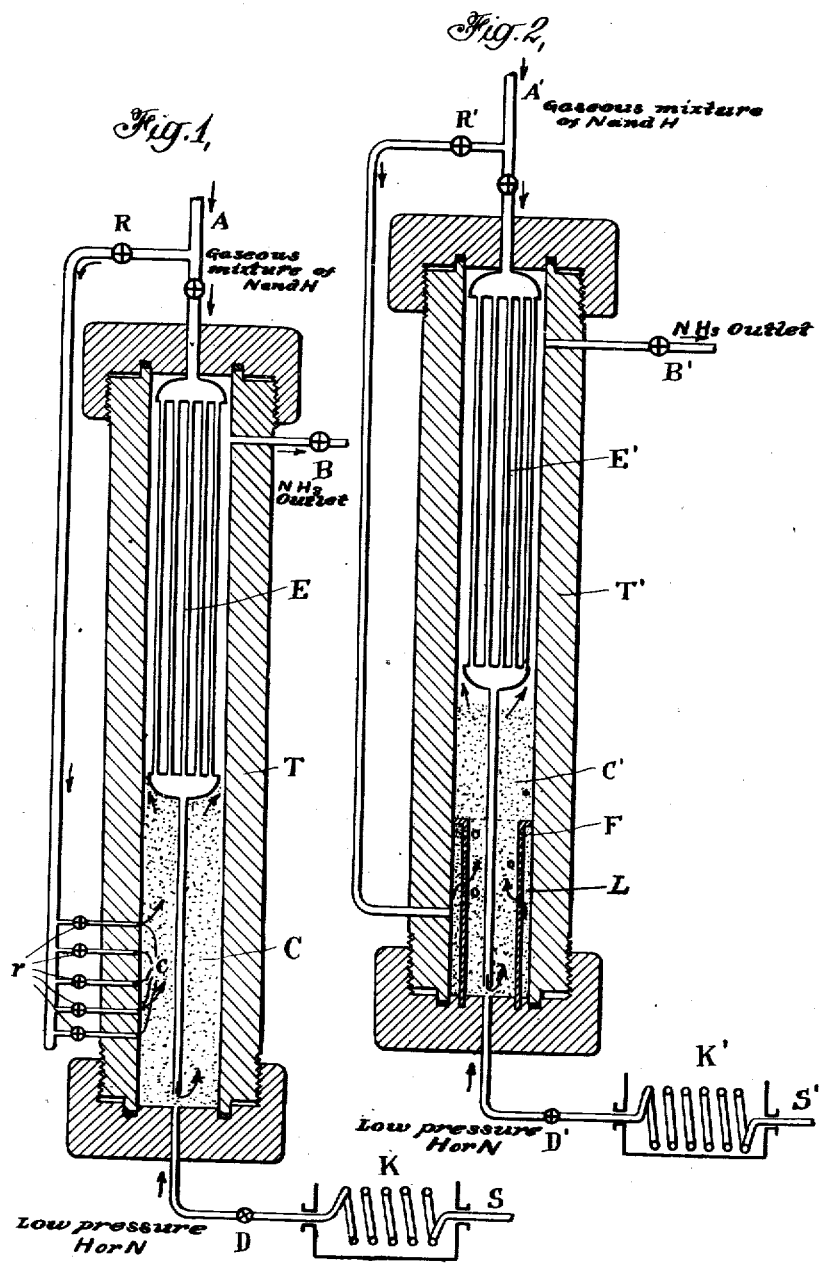

1,544,373

UNITED STATES PATENT OFFICE.

GEORGES CLAUDE, OF PARIS, FRANCE, ASSIGNOR, BY MESNE ASSIGNMENTS, TO LAZOTE, INC., A CORPORATION OF DELAWARE.

METHOD FOR THE DIRECT SYNTHESIS OF AMMONIA.

Application filed September 8, 1920. Serial No. 408,940.

*To all whom it may concern:*

Be it known that I, GEORGES CLAUDE, a citizen of France, residing at Paris, France, have invented certain new and useful Improvements in Methods for the Direct Synthesis of Ammonia; and I do hereby declare the following to be a full, clear, and exact description of the invention, such as will enable others skilled in the art to which it appertains to make and use the same.

This invention relates to improvements in processes involving the combination of hydrogen and nitrogen under the combined effect of suitable catalyzers, of a sufficient temperature and of very high pressures, equal to or greater than 400 atmospheres, which in earlier patents I have called hyperpressures, particularly in the United States Patent No. 1,332,460 of March 2, 1920, for "Process for the synthetic production of ammonia."

The factor of combination attains very high values in such a process approaching substantially 50% under 800 atmospheres. Enormous quantities of heat are thus disengaged per unit of volume of the catalyzing chamber, and the elimination of this heat across the wall of the apparatus becomes a more difficult problem as the capacity of the apparatus considered, is increased. If, in spite of the use of exterior coils traversed by water, or of a jacket in which the heat eliminated produces steam at high pressure conforming to the above mentioned patent, the quantity of heat to be discharged per unit of surface of the wall becomes greater than the capacity of calorific transmission of that wall, we will be obliged to elongate the catalytic apparatus more than would be necessary if the heat could be discharged easily. On the other hand, the circulation of refrigerating fluids through the interior of the apparatus is difficult to accomplish because of the peculiar conditions of pressure and temperature which should prevail.

This difficulty of discharging to the outside the heat of reaction would moreover lead to another result which would seriously affect the strength of the apparatus. To understand this, it is necessary to note, from the very first, that if all of the heat of reaction corresponding to a factor of combination of substantially 50%, taken here as an example and possible because of the use of hyper-pressures, could be maintained in the reacting gases, it would be capable of heating them from 400 to 500° C. above their initial temperature of reaction, which is for example 550° C., that is to say, raising them to 1000° to 1100° C. Obviously such a temperature is incompatible with a yield of substantially 30% of ammonia in the gas, which corresponds to a factor of combination of 50%, and the reaction, assumed to be adiabatic, is of necessity notably more limited. However, since one of the effects of hyper-pressures is to maintain at still elevated values the equilibrium yield for very high temperatures, and since on the other hand, the reaction inclines to increase all the more rapidly toward the possible limit as the temperature rises through the reaction, it results that we may nevertheless obtain very rapidly a large proportion of the 50% combination almost in an adiabatic manner, especially in large apparatus in which enormous quantities of heat are produced in proportion to the capacity of transmission of the wall.

There results an extreme elevation of temperature of the reacting gases attaining, for example 200 to 250° C. in the first effective zones of the catalytic chamber. Then, if the reacting gases travel over the catalyzer, following the usual practice, after having been raised as a whole to the initial temperature of reaction by their passage through an exchanger of temperature in the inverse direction, and in indirect contact with gases which have reacted, their temperature will increase rapidly from 600° C., for example, up to 800 or 850° C. in the first effective zones of the catalyzing chamber. The reaction could not then be completed as desired unless we eliminate some of the heat, through the wall or otherwise, during the further passage of the gases in contact with the catalyzer. Moreover, and it is the essential fact on which we here insist, this temperature of the order of 800° C. would be the cause of grave danger for the resistance of the reaction apparatus. It is possible in fact by this excessive value to destroy the protecting quality of the thermic and chemical insulating bed, which has been referred to in the preceding patents, notably in the United States Patent No. 1,452,594 for "Protection of the walls of chambers in which reactions at very high temperature and pressure are conducted,"

or the wall of the chamber of the apparatus, if this is made of an alloy resistant only to temperatures of 600 to 700° C., or to chemical effects which these temperatures develop.

Under all circumstances, it is then necessary, and such is the purpose of the present invention, to find a method of limiting the temperature, other than the known means of elimination of heat across the wall of the apparatus, or by interior circulation of refrigerating fluids.

This method in general, involves primarily, as soon as the reaction is started, to send a part regulated at will, of the gases to be treated directly over the catalyzer, without heating them previously by passage through an exchanger of temperature or in any other manner, and by mixing them with a part of the gases which, introduced hot, circulate over the catalyzer. I utilize thus directly in the most efficient manner the peculiar capacity of heating of these gases for limiting the temperature of reaction.

This method could be applied in various ways, of which two are illustrated by way of example, in the accompanying drawing, in which Fig. 1 is a longitudinal section through an apparatus adapted to the practice of the invention, and Fig. 2 is a similar view of a slightly different form of apparatus.

In the respective figures T or T' is the catalytic chamber assumed to be of metal, avoiding the use on its interior of an insulating lining. "A" or "A'" is the inlet for the gases to react, "E" or "E'" is the exchanger of temperature between the gas inlets and gas outlets indicated by "B" or "B'", "C" or "C'" is the catalyzer, "R" or "R'" is the valve whereby I send, as soon as the reaction is started, a portion of the gas to be treated directly over the catalyzer. The other portion is heated by its passage in the exchanger "E" or "E'" to the necessary temperature of reaction, and then circulates in contact with the catalyzer and progressively combines.

Following Fig. 1, an example of the operation consists in mixing with this fraction also progressively and in contact with the catalyzing material itself, the remainder of the cold gas which enters through a series of passages "c" and of regulating valves "r." Because of the cooling caused by the introduction of cold gases to the reaction mass, and the checking of the speed of reaction initiated, at equal temperature, by the more and more elevated yield of ammonia in the mixture, we understand that we have thus the possibility of regulating the temperature so that it does not exceed at any point, the value which we desire, 650° C. for example. This value will be preferably lower, all things being equal, while the proportion of gases which pass in the exchanger "E" is smaller, and this proportion may become only one-third of the total volume of the gaseous mixture, since the heat of reaction which could heat all of the gases treated by more than 400° C. would be counterbalanced by the heating to 600° C., the temperature of reaction, of ⅔ of the gaseous mass not passing through the exchanger.

Fig. 2 shows another mode of operating, consisting in introducing at one time the portion of the cold gases to the catalyzing chamber, separated through a part of its length from the outer chamber "T'" by a concentric shell "F." This arrangement has, over the preceding, the advantage that the circulation of cold gas in the annular space formed between the shell and the chamber, acts as a protecting screen for the wall in the exact zone where the reaction would be most active, following the fact that the yield of ammonia here is more remote from that of equilibrium. However, the introduction of the cold gas in the annular space ought not to be carried on at the beginning of the catalyzing chamber, for, the reacting gases there having not yet a sufficient temperature, the abundant flow of very cold gas in this zone could paralyze the reaction. The point of introduction of the cold gas ought then to be in the zone where the reaction of the hot gases has already attained a great activity, where the temperature is from 700 to 750° C., a temperature which the wall would not have to support because of the protecting effect of the cold gas previously referred to.

This cold gas penetrates progressively in the catalyzing chamber because of the small orifices "o," pierced through the shell "F," and in order that the greater part of the gas should not tend to pass only through the upper orifices, the annular space could be filled with grains of a non-catalytic material L of the size identical with that of the catalyzer to create a pressure drop identical throughout the device. The regulation of the ratios between the quantities of cold gases and of hot gases is made by the manipulation of the valve "R" following the indications of a thermocouple.

In the preceding examples the gases leaving, carry with them a part of the heat of reaction, namely, all that which is not dissipated from the exterior surface of the catalyzing apparatus. The exchanger not having to support any difference of pressure, the high temperature does not effect it. The heat of the gas leaving could eventually be utilized externally, for example in the production of power, before the extraction of the ammonia which the gas contains.

If, contrary to the representations in the drawing, the chamber is of metal necessitating protection by a thermic and chemically insulating bed, it is naturally necessary to preserve a circulation of heat sufficiently active through the wall to ensure, across the insulating bed, a fall of temperature sufficient to permit it to act as a thermic screen. It will be necessary then to maintain in this case a certain cooling of the exterior surface of the catalyzing apparatus, and to decrease consequently the quantity of cold gas delivered by the valve "R" or "R'."

In starting the apparatus described hereinbefore, I may heat electrically the interior of the apparatus by means such as have been described in other patents, notably in the first of the patents referred to above.

I may also, following Figs. 1 and 2, introduce by "S" or "S'" a current of hydrogen or of nitrogen at a low pressure heated by its passage across an iron coil "K" or "K'" which is itself heated in any suitable manner. The gas introduced by the valve "D" or "D'" and escaping by the orifice B or B' gives up its heat to the catalyzer and to the apparatus, and when the desired temperature is attained at the end of the catalyzing chamber, we stop, by closing the valve "D" or "D'," the circulation of the heating gas, and send the total quantity of hyper-compressed reacting gases through the exchanger. The reaction is thus initiated with great activity. I introduce then through the valve "R" or "R'" a progressively increasing part of the hyper-compressed gas until the normal operation is established.

It is evident that the present invention could be applied to the case in which the synthesis of ammonia is carried out under pressures and in which by reason of the activity of the catalyzing material there is a very considerable release of heat per unit of volume of the apparatus.

I claim:

1. A process of producing ammonia by synthesis from a gaseous mixture of nitrogen and hydrogen under high pressure in the presence of a catalyst, which comprises cooling and thereby maintaining the pressure-sustaining wall of the reaction chamber below the temperature of the reaction by contact of the gaseous mixture therewith before the gaseous mixture reaches the catalyst.

2. A process of producing ammonia by synthesis from a gaseous mixture of nitrogen and hydrogen under high pressure in the presence of a catalyst, which comprises cooling and thereby maintaining the pressure-sustaining wall of the reaction chamber below the temperature of the reaction by contact of the gaseous mixture therewith and directing the gaseous mixture thus heated upon the catalyst.

3. A process of producing ammonia by synthesis from a gaseous mixture of nitrogen and hydrogen under pressure in the presence of a catalyst, which comprises cooling the pressure-sustaining wall of the reaction chamber below the temperature of the reaction by contact of the gaseous mixture therewith and directing the gaseous mixture thus heated upon the catalyst at successive zones thereof.

4. A process of producing ammonia by synthesis from a gaseous mixture of nitrogen and hydrogen in the presence of a catalyst, which comprises cooling the pressure-sustaining wall of the reaction chamber below the temperature of the reaction by contact of a portion of the gaseous mixture therewith, heating the balance of the gaseous mixture by heat exchange with the products of the reaction and combining the two portions in contact with the catalyst.

5. A process of producing ammonia by synthesis from a gaseous mixture of nitrogen and hydrogen in the presence of a catalyst, which comprises cooling the pressure-sustaining wall of the reaction chamber below the temperature of the reaction by contact of a portion of the gaseous mixture therewith, heating the balance of the gaseous mixture by heat exchange with the products of the reaction and adding the first mentioned portion to the balance of the gaseous mixture at successive zones of the catalyst.

6. A process of producing ammonia by synthesis from a gaseous mixture of nitrogen and hydrogen under pressure in the presence of a catalyst, which comprises mixing separate portions of the gaseous mixture at different temperatures in contact with the catalyst and during the reaction.

7. A process of producing ammonia by synthesis from a gaseous mixture of nitrogen and hydrogen under pressure in the presence of a catalyst, which comprises mixing separate portions of the gaseous mixture at different temperatures in contact with the catalyst and during the reaction, the colder portion being added at successive stages of the reaction.

8. A process of producing ammonia by direct synthesis of its elements under pressure, which comprises preheating only part of the gases to react, causing this part to combine in the presence of a catalyst while adding to the part in course of reaction successive portions of the balance of the gases to react.

9. A process of producing ammonia by direct synthesis of its elements under pressure, which comprises introducing a fraction of the gases to react after preheating to a reaction chamber and sending successive not previously preheated portions of the balance of the gases to react to successive zones of the chamber.

10. A process of producing ammonia by direct synthesis of its elements under pressure, which comprises introducing a fraction of the gases to react after preheating to a catalyst in a reaction chamber, circulating inside the chamber around the catalyzing material the balance of the mixture and then sending it into contact with the catalyzing material.

11. A process of producing ammonia by direct synthesis of its elements under pressure, which comprises introducing a fraction of the gases to react after preheating to a catalyst in a reaction chamber, circulating inside the chamber around the catalyzing material the balance of the mixture and then progressively distributing it to the catalyst in the chamber.

12. A process of producing ammonia by synthesis of its elements under pressure in the presence of a catalytic body, which comprises passing incoming gases in heat-exchange contiguity to the hot gases of the reaction, and then heating the gases to substantially the temperature necessary for reaction by passing the preheated gases through and in unrestricted thermal contact with the catalytic body and thence into direct contact with the said catalytic body.

13. A process of producing ammonia by synthesis of its elements under pressure in the presence of a catalytic body, which comprises passing the incoming gases in heat-exchange contiguity to the hot gases of the reaction, then passing the preheated gases through a conduit positioned within the catalytic body and thence into contact with said catalytic body, and passing another portion of the incoming gases between the interior wall of the pressure-sustaining tube and the catalytic body, and then passing said portion into the catalytic body.

14. A process of producing ammonia by synthesis of its elements under pressure in the presence of a catalytic body, which comprises preheating incoming gases by the heat evolved from the reaction and finally heating the gases to substantially the temperature necessary for reaction by passing them through and in unrestricted thermal contact with the interior of the catalytic body before actual contact with the catalytic body.

15. A process of producing ammonia by synthesis of its elements under pressure in the presence of a catalytic body, which comprises cooling and thereby maintaining the pressure-sustaining wall of the reaction chamber below the temperature of reaction by contact of the said elements therewith, and thereafter permitting said elements to absorb additional heat from the catalyst.

16. A process of producing ammonia by synthesis from a gaseous mixture of its elements under pressure in the presence of a catalytic body, which comprises cooling the pressure-sustaining wall of the reaction chamber by means of a gaseous stream contacting with the inner surface of the pressure-sustaining wall and heating the gaseous mixture prior to reaction by passage through the interior of the catalytic body before actual contact therewith.

17. A process of producing ammonia by synthesis from a gaseous mixture of its elements under high pressure in the presence of a catalytic body, which comprises cooling below the temperature of the reaction the pressure-sustaining wall of the reaction chamber adjacent the catalytic body, by contact of the gases therewith, and thereafter permitting the gases to absorb additional heat from the catalyst.

18. A process of producing ammonia by synthesis from a gaseous mixture of its elements under high pressure in the presence of a catalytic body, which comprises cooling the portions of the high pressure-sustaining wall of the reaction chamber that would be subject to the greatest heat of the reaction below the temperature of the reaction, by contact with the incoming gaseous mixture, and thereafter permitting the gaseous mixture to absorb additional heat from the catalyst.

19. A process of producing ammonia by synthesis from a gaseous mixture of its elements under high pressure in the presence of a catalytic body, which comprises protecting the pressure-sustaining wall of the reaction chamber from the temperature of the reaction at a zone where the reaction is most active, by interposing the incoming gases on their way to the reaction between the pressure-sustaining wall and the catalytic body and thereafter permitting the gases to absorb additional heat from the catalyst.

20. A process of producing ammonia by synthesis from a gaseous mixture of nitrogen and hydrogen in the presence of a catalyst, which comprises cooling the pressure-sustaining wall of the reaction chamber below the temperature of the reaction by contact of a portion of the gaseous mixture therewith and heating the balance of the gaseous mixture by heat exchange with the products of the reaction.

21. A process of producing ammonia by synthesis of its elements under pressure in the presence of a catalytic body, which comprises passing the incoming gases in heat exchange contiguity to the hot gases of the reaction, then passing the preheated gases through a conduit positioned within the catalytic body and thence into contact with the catalytic body and cooling the wall of the pressure-sustaining tube by a gaseous stream contacting with the inner surface thereof.

22. A process of producing ammonia by synthesis of its elements under pressure in the presence of a catalytic body, which comprises passing the incoming gases in heat exchange contiguity to the hot gases of the reaction, then passing the preheated gases through a conduit positioned within the catalytic body and thence into contact with the catalytic body, passing another portion of the incoming gases in contact with the interior wall of the pressure-sustaining tube and then passing said portion into the catalytic body.

23. A process of producing ammonia by synthesis of its elements under pressure in the presence of a catalytic body, which comprises passing the incoming gases in heat exchange contiguity to the hot gases of the reaction, then passing the preheated gases through a conduit positioned within the catalytic body and thence into contact with said catalytic body, and passing another portion of the incoming gases in contact with the interior wall of the pressure-sustaining tube.

In testimony whereof I affix my signature.

GEORGES CLAUDE.

22. A process of producing ammonia by synthesis of its elements under pressure in the presence of a catalytic body, which comprises passing the incoming gases in heat exchange contiguity to the hot gases of the reaction, then passing the preheated gases through a conduit positioned within the catalytic body and thence into contact with the catalytic body, passing another portion of the incoming gases in contact with the interior wall of the pressure-sustaining tube and then passing said portion into the catalytic body.

23. A process of producing ammonia by synthesis of its elements under pressure in the presence of a catalytic body, which comprises passing the incoming gases in heat exchange contiguity to the hot gases of the reaction, then passing the preheated gases through a conduit positioned within the catalytic body and thence into contact with said catalytic body, and passing another portion of the incoming gases in contact with the interior wall of the pressure-sustaining tube.

In testimony whereof I affix my signature.

GEORGES CLAUDE.

DISCLAIMER 1,544,373.—*Georges Claude*, Paris, France. METHOD FOR THE DIRECT SYNTHESIS OF AMMONIA. Patent dated June 30, 1925. Disclaimer filed September 30, 1932, by the assignee, *E. I. Du Pont De Nemours & Company*.

Hereby enters the following disclaimer:

It disclaims claims 12 and 14, reading:

"12. A process of producing ammonia by synthesis of its elements under pressure in the presence of a catalytic body, which comprises passing incoming gases in heat-exchange contiguity to the hot gases of the reaction, and then heating the gases to substantially the temperature necessary for reaction by passing the preheated gases through and in unrestricted thermal contact with the catalytic body and thence into direct contact with the said catalytic body."

"14. A process of producing ammonia by synthesis of its elements under pressure in the presence of a catalytic body, which comprises preheating incoming gases by the heat evolved from the reaction and finally heating the gases to substantially the temperature necessary for reaction by passing them through and in unrestricted thermal contact with the interior of the catalytic body before actual contact with the catalytic body."

[*Official Gazette October 25, 1932.*]

DISCLAIMER 1,544,373.—*Georges Claude*, Paris, France. METHOD FOR THE DIRECT SYNTHESIS OF AMMONIA. Patent dated June 30, 1925. Disclaimer filed September 30, 1932, by the assignee, *E. I. Du Pont De Nemours & Company*.

Hereby enters the following disclaimer:

It disclaims claims 12 and 14, reading:

"12. A process of producing ammonia by synthesis of its elements under pressure in the presence of a catalytic body, which comprises passing incoming gases in heat-exchange contiguity to the hot gases of the reaction, and then heating the gases to substantially the temperature necessary for reaction by passing the preheated gases through and in unrestricted thermal contact with the catalytic body and thence into direct contact with the said catalytic body."

"14. A process of producing ammonia by synthesis of its elements under pressure in the presence of a catalytic body, which comprises preheating incoming gases by the heat evolved from the reaction and finally heating the gases to substantially the temperature necessary for reaction by passing them through and in unrestricted thermal contact with the interior of the catalytic body before actual contact with the catalytic body."

[*Official Gazette October 25, 1932.*]